(12) United States Patent
Tse et al.

(10) Patent No.: US 8,976,781 B1
(45) Date of Patent: Mar. 10, 2015

(54) APPARATUS AND METHOD FOR CALIBRATING A COMPONENT OF A TRANSCEIVER VIA A CALIBRATION CIRCUIT OPERATING IN DIFFERENT CALIBRATION MODES

(71) Applicant: Marvell International Ltd., Hamilton (BM)

(72) Inventors: Lawrence Tse, Fremont, CA (US); King Chun Tsai, San Jose, CA (US); George Chien, Cupertino, CA (US); Tyson Leistiko, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/101,644

(22) Filed: Dec. 10, 2013

Related U.S. Application Data (63) Continuation of application No. 12/907,837, filed on Oct. 19, 2010, now Pat. No. 8,605,633, which is a continuation of application No. 11/322,019, filed on Dec. 29, 2005, now Pat. No. 7,817,998, which is a continuation of application No. 10/238,475, filed on Sep. 10, 2002, now Pat. No. 7,006,824.

(51) Int. Cl.
*H04B 7/00* (2006.01)
*H04W 56/00* (2009.01)

(52) U.S. Cl.
CPC .................................. *H04W 56/003* (2013.01)
USPC ........... 370/350; 370/310; 370/342; 370/349; 455/572; 455/68; 455/333; 375/296; 375/322; 375/133; 375/219

(58) Field of Classification Search
CPC .................................. H04B 7/00; H04B 7/216
USPC ............ 370/310, 342, 349; 455/572, 68, 333, 455/234.1, 313, 232.1, 92.2, 450; 375/296, 375/322, 133, 345, 219
See application file for complete search history.

(56) References Cited

U.S. PATENT DOCUMENTS

| | | |
|---|---|---|
| 4,031,469 A | 6/1977 | Johnson |
| 4,513,412 A | 4/1985 | Cox |
| 5,212,826 A | 5/1993 | Rabe et al. |
| 5,548,840 A | 8/1996 | Heck |
| 5,589,791 A | 12/1996 | Gilbert |
| 5,724,653 A | 3/1998 | Baker et al. |
| 5,752,171 A | 5/1998 | Akiya |
| 5,805,988 A | 9/1998 | Clayton et al. |

(Continued)

*Primary Examiner* — Jamal Javaid (57) ABSTRACT

A system including a component of a transceiver, a comparator, a counter, and a calibration circuit. The component receives an input signal comprising packets and based on the input signal, generates output signals to transmit the packets. The comparator compares the output signals to generate a comparison signal. The counter counts cycles of a clock signal to provide a count value. The control device, based on the comparison signal, transitions the counter between incrementing the count value and decrementing the count value. The calibration circuit operates in first and second calibration modes; during the first calibration mode, calibrates the component until the counter transitions a predetermined number of times between incrementing the count value and decrementing the count value; and during the second calibration mode, calibrates the component until (i) the counter transitions between incrementing and decrementing the count value, or (ii) counts a predetermined number of cycles.

19 Claims, 9 Drawing Sheets

(56) References Cited

U.S. PATENT DOCUMENTS

| | | |
|---|---|---|
| 5,859,559 A | 1/1999 | Hong et al. |
| 5,886,547 A | 3/1999 | Durec et al. |
| 6,081,701 A | 6/2000 | Norimatsu |
| 6,084,869 A | 7/2000 | Fishman et al. |
| 6,118,811 A | 9/2000 | Narumi et al. |
| 6,122,497 A | 9/2000 | Gilbert |
| 6,275,090 B1 | 8/2001 | Burger et al. |
| 6,324,228 B1 | 11/2001 | Millward et al. |
| 6,366,622 B1 | 4/2002 | Brown et al. |
| 6,560,447 B2 | 5/2003 | Rahman et al. |
| 6,639,447 B2 | 10/2003 | Manku et al. |
| 6,650,883 B1 | 11/2003 | Stephane et al. |
| 6,754,199 B1 | 6/2004 | Choi et al. |
| 6,983,135 B1 | 1/2006 | Tsai et al. |
| 7,110,783 B2 | 9/2006 | Bahl et al. |
| 7,177,620 B1 | 2/2007 | Tsai et al. |
| 7,215,933 B1 | 5/2007 | Tse et al. |
| 2001/0028275 A1 | 10/2001 | Matsugatani et al. |
| 2002/0015458 A1 | 2/2002 | Van Sinderen |
| 2002/0181521 A1 | 12/2002 | Crowder et al. |
| 2003/0003891 A1 | 1/2003 | Kivekas et al. |
| 2003/0027531 A1 | 2/2003 | Malhi et al. |
| 2003/0038617 A1 | 2/2003 | Yaklin |
| 2003/0069049 A1 | 4/2003 | Poranen et al. |
| 2003/0129958 A1 | 7/2003 | Behzad |
| 2003/0228858 A1 | 12/2003 | Zhang et al. |
| 2004/0043742 A1 | 3/2004 | Beumer |

APPARATUS AND METHOD FOR CALIBRATING A COMPONENT OF A TRANSCEIVER VIA A CALIBRATION CIRCUIT OPERATING IN DIFFERENT CALIBRATION MODES

CROSS-REFERENCE TO RELATED APPLICATIONS

The present disclosure is a continuation of U.S. patent application Ser. No. 12/907,837 (now U.S. Pat. No. 8,605, 633), filed on Oct. 19, 2010, which is a continuation of U.S. patent application Ser. No. 11/322,019 (now U.S. Pat. No. 7,817,998), filed Dec. 29, 2005, which is a continuation of U.S. patent application Ser. No. 10/238,475 (now U.S. Pat. No. 7,006,824), filed Sep. 10, 2002. The entire disclosures of the applications referenced above are incorporated herein by reference.

TECHNICAL FIELD

The present invention relates to wireless transceivers, and more particularly to calibration of frame/packet-based wireless transceivers.

BACKGROUND

Figure 1:
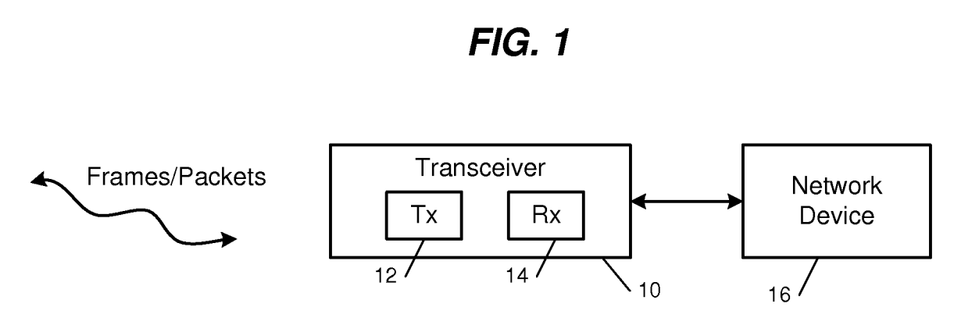
FIG. 1 is a functional block diagram of an exemplary wireless transceiver according to the prior art.

Referring now to FIG. 1, a wireless transceiver 10 is shown and includes a transmitter 12 and a receiver 14. The wireless transceiver 10 may be used in a local area network (LAN) and may be attached to a Baseband Processor (BBP) and a Media Access Controller (MAC) in either a station or an Access Point (AP) configuration. A network interface card (NIC) is one of the various "STATION" configurations. The NIC can be connected to a networked device 16 such as a laptop computer, a personal digital assistant (PDA) or any other networked device. When the transceiver 10 is attached to an access point (AP) MAC, an AP is created. The AP provides network access for WLAN stations that are associated with the transceiver 10.

The wireless transceiver 10 transmits and receives frames/packets and provides communication between two networked devices. In AdHoc mode, the two devices can be two laptop/personal computers. In infrastructure mode, the two devices can be a laptop/personal computer and an AP.

Figure 2A:
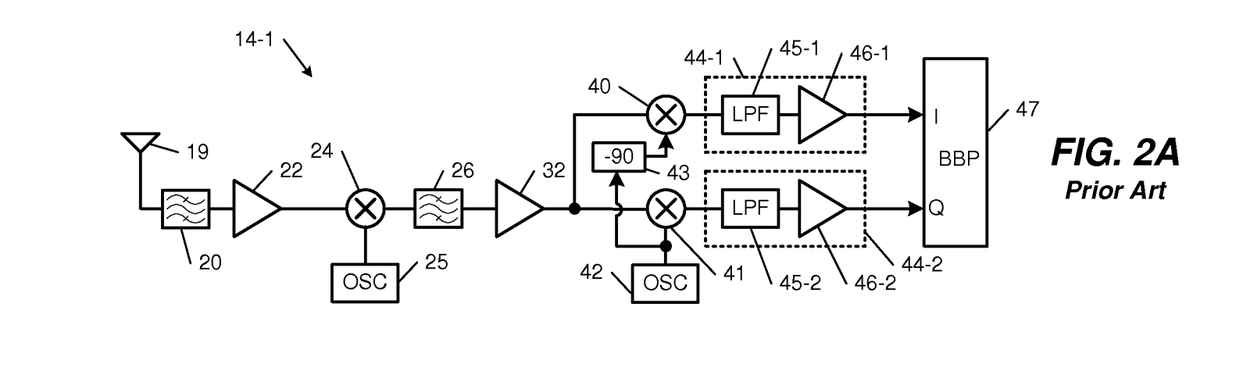
FIG. 2A is a functional block diagram of an exemplary super-heterodyne receiver architecture according to the prior art.

There are multiple different ways of implementing the transmitter 12 and the receiver 14. For purposes of illustration, simplified block diagrams of super-heterodyne and direct conversion transmitter and receiver architectures will be discussed, although other architectures may be used. Referring now to FIG. 2A, an exemplary super-heterodyne receiver 14-1 is shown. The receiver 14-1 includes an antenna 19 that is coupled to an optional RF filter 20 and a low noise amplifier 22. An output of the amplifier 22 is coupled to a first input of a mixer 24. A second input of the mixer 24 is connected to an oscillator 25, which provides a reference frequency. The mixer 24 converts radio frequency (RF) signals to intermediate frequency (IF) signals.

An output of the mixer 24 is connected to an optional IF filter 26, which has an output that is coupled to an automatic gain control amplifier (AGCA) 32. An output of the AGCA 32 is coupled to first inputs of mixers 40 and 41. A second input of the mixer 41 is coupled to an oscillator 42, which provides a reference frequency. A second input of the mixer 40 is connected to the oscillator 42 through a −90° phase shifter 43. The mixers 40 and 41 convert the IF signals to baseband (BB) signals. Outputs of the mixers 40 and 41 are coupled to BB circuits 44-1 and 44-2, respectively. The BB circuits 44-1 and 44-2 may include low pass filters (LPF) 45-1 and 45-2 and gain blocks 46-1 and 46-2, respectively, although other BB circuits may be used. Mixer 40 generates an in-phase (I) signal, which is output to a BB processor 47. The mixer 41 generates a quadrature-phase (Q) signal, which is output to the BB processor 47.

Figure 2B:
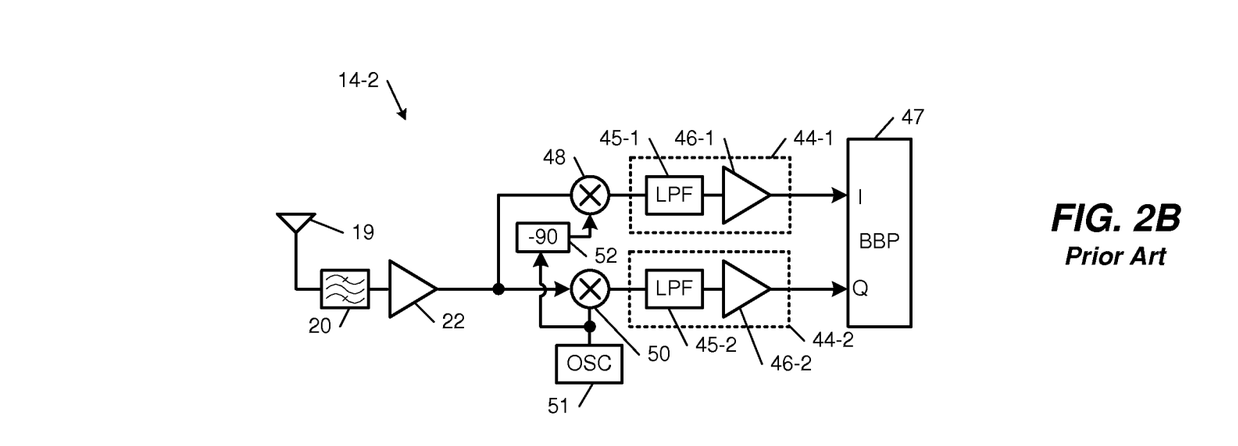
FIG. 2B is a functional block diagram of an exemplary direct receiver architecture according to the prior art.

Referring now to FIG. 2B, an exemplary direct receiver 14-2 is shown. The receiver 14-2 includes the antenna 19 that is coupled the optional RF filter 20 and to the low noise amplifier 22. An output of the low noise amplifier 22 is coupled to first inputs of RF to BB mixers 48 and 50. A second input of the mixer 50 is connected to oscillator 51, which provides a reference frequency. A second input of the mixer 48 is connected to the oscillator 51 through a −90° phase shifter 52. The mixer 48 outputs the I-signal to the BB circuit 44-1, which may include the LPF 45-1 and the gain block 46-1. An output of the BB circuit 44-1 is input to the BB processor 47. Similarly, the mixer 50 outputs the Q signal to the BB circuit 44-2, which may include the LPF 45-2 and the gain block 46-2. An output of the BB circuit 44-2 is output to the BB processor 47.

Figure 3A:
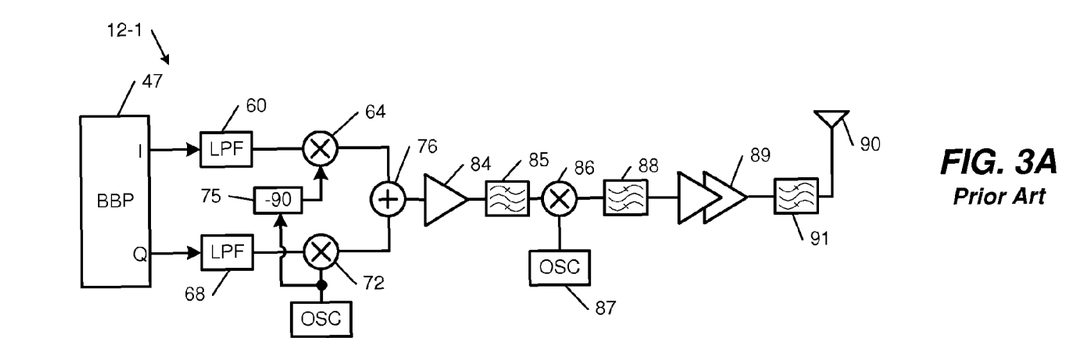
FIG. 3A is a functional block diagram of an exemplary super-heterodyne transmitter architecture according to the prior art.

Referring now to FIG. 3A, an exemplary super-heterodyne transmitter 12-1 is shown. The transmitter 12-1 receives an I signal from the BB processor 47. The I signal is input to a LPF 60 that is coupled to a first input of a BB to IF mixer 64. A Q signal of the BB processor 47 is input to a LPF 68 that is coupled to a first input of a BB to IF mixer 72. The mixer 72 has a second input that is coupled to an oscillator 74, which provides a reference frequency. The mixer 64 has a second input that is coupled to the oscillator through a −90° phase shifter 75.

Outputs of the mixers 64 and 72 are input to a summer 76. The summer 76 combines the signals into a complex signal that is input to a variable gain amplifier (VGA) 84. The VGA 84 is coupled to an optional IF filter 85. The optional IF filter 85 is connected to a first input of an IF to RF mixer 86. A second input of the mixer 86 is connected to an oscillator 87, which provides a reference frequency. An output of the mixer 86 is coupled to an optional RF filter 88. The optional RF filter 88 is connected to a power amplifier 89, which may include a driver. The power amplifier 89 drives an antenna 90 through an optional RF filter 91.

Figure 3B:
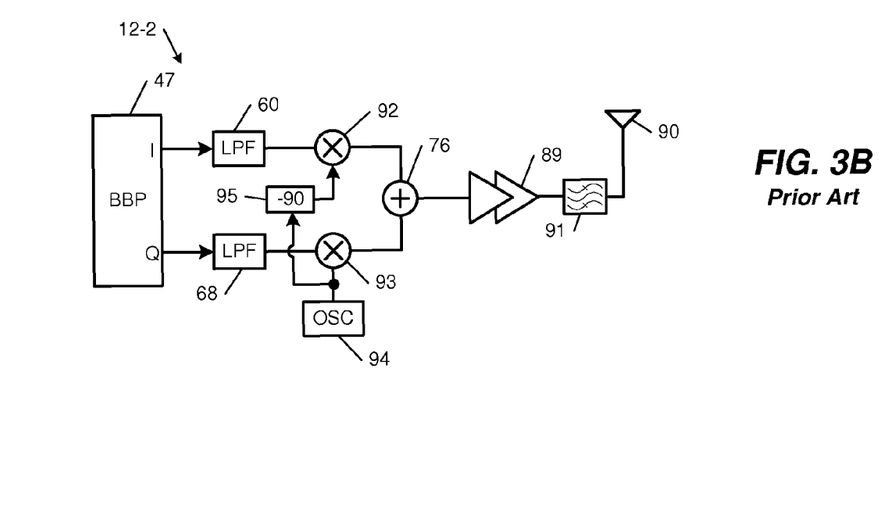
FIG. 3B is a functional block diagram of an exemplary direct transmitter architecture according to the prior art.

Referring now to FIG. 3B, an exemplary direct transmitter 12-2 is shown. The transmitter 12-2 receives an I signal from the BB processor 47. The I signal is input to the LPF 60, which has an output that is coupled to a first input of a BB to RF mixer 92. A Q signal of the BB processor 47 is input to the LPF 68, which is coupled to a first input of a BB to RF mixer 93. The mixer 93 has a second input that is coupled to an oscillator 94, which provides a reference frequency. The mixer 92 has a second input that is connected to the oscillator 94 through a −90° phase shifter 95. Outputs of the mixers 92 and 93 are input to the summer 76. The summer 76 combines the signals into a complex signal that is input the power amplifier 89. The power amplifier 89 drives the antenna 90 through the optional RF filter 91. The RF and IF filters in FIGS. 2A, 2B, 3A and 3B may be implemented on-chip or externally.

The transceiver may include several integrated circuits (ICs) or a single IC. The IC(s) may be implemented using various different process technologies such as CMOS, SiGe, GaAs, other technologies, and/or combinations thereof. Different process technologies are selected depending upon design considerations such as desired cost, size, and/or switching speed. For example, CMOS technology may be used to implement transceiver ICs due to its relatively low cost. The transceiver may operate in accordance with IEEE section 802.11b or 802.11g, which is hereby incorporated by reference, and at frequencies between 2.4-2.5 GHz.

During volume production of the transceiver IC, the values and/or characteristics of resistors, capacitors, transistors and other elements used in the transceiver components may vary due to process variations. These variations may adversely impact performance of the transceiver IC. In use, power supply voltage variation and temperature variations of the environment may also adversely impact the performance of the transceiver IC.

Calibration techniques are conventionally used to adjust one or more performance parameters such as DC offset and gain of various circuit building blocks of an IC to reduce and/or eliminate performance variations. For example, a NIC is plugged into a PCMCIA slot of a laptop computer and the laptop computer is turned on. Upon power up, a power supply voltage is output to the transceiver and a calibration mode is typically initiated. The calibration mode adjusts a preset performance parameter. The temperature of the PCMCIA slot is still relatively close to room temperature. Operation of the transceiver IC is improved due to the calibration.

A few minutes later, the temperature of the computer and the PCMCIA slot is typically much higher than during power-on. As a result, the calibration that was performed at power-on may no longer be an effective calibration. Additional environmental temperature changes may occur for mobile user applications, for example when the user transitions from an inside location to an outside location.

SUMMARY

A packet-based wireless transceiver according to the present invention that transmits and receives data packets includes a transceiver component including an adjustable performance parameter. A calibration circuit adjusts the performance parameter of the transceiver component at times synchronized with the data packets.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DESCRIPTION

The following description of the preferred embodiment(s) is merely exemplary in nature and is in no way intended to limit the invention, its application, or uses. For purposes of clarity, the same reference numbers will be used in the drawings to identify similar elements. As used herein, packet-based calibration also includes frame-based calibration.

Conventional full calibration may take significantly longer than available idle time between data packets. If conventional full calibration is performed after the transceiver begins operation, it may overlap times when data packets are received and/or transmitted. Transceiver ICs, such as RF circuits that detect UV signals, are sensitive circuits. Performance of these IC's is compromised when conventional calibration occurs at the same time that packets are transmitted or received. Conventional calibration circuits may generate unacceptable switching noise that degrades transceiver performance. Therefore, conventional transceivers usually do not calibrate after the initial full calibration.

Incremental calibration is performed from a current value rather than a preset value. In contrast, full calibration is performed from a preset value rather than a current value. Full calibration is conventionally performed during power up before the transceiver begins transmitting and receiving data packets. While one-time calibration works well in the short term, the underlying environmental conditions upon which the full calibration is based may change during use. For example, when the transceiver is integrated with or attached to a mobile device, the environmental and operating temperatures may change during use.

A calibration circuit and method according to the present invention performs packet-based calibration at times synchronized with the data packets. For example, calibration can be performed during idle time between data packets. However, calibration may also be performed during non-idle times and/or during idle and non-idle times.

The packet-based calibration can be full calibration and/or incremental calibration. The calibration circuits and methods according to the present invention minimize interference that would otherwise occur if conventional full calibration was performed more frequently, for example after the transceiver begins transmitting and receiving data packets. In addition, the present invention minimizes performance degradation due to environmental changes such as operating and/or environmental temperature changes.

The packet-based calibration may be performed instead of and/or in addition to full calibration that occurs in various situations such as power on. For example, packet-based calibration is performed for circuits that exhibit higher temperature sensitivity such as transmitter and receiver RF mixer gain and transmitter and receiver DC offset voltage.

Packet-based calibration improves the operation of the transceiver by correcting changes that occur as the transceiver warms up during operation, is moved to a new environment, and/or otherwise experiences temperature changes, power supply voltage changes, etc. The present invention will be described in conjunction with several exemplary implementations including transmitter and receiver DC offset calibration circuits and transmitter and receiver RF mixer gain calibration circuits. As can be appreciated by skilled artisans, packet-based calibration can be performed to adjust other performance parameters of these and other transceiver components.

Figure 4A:
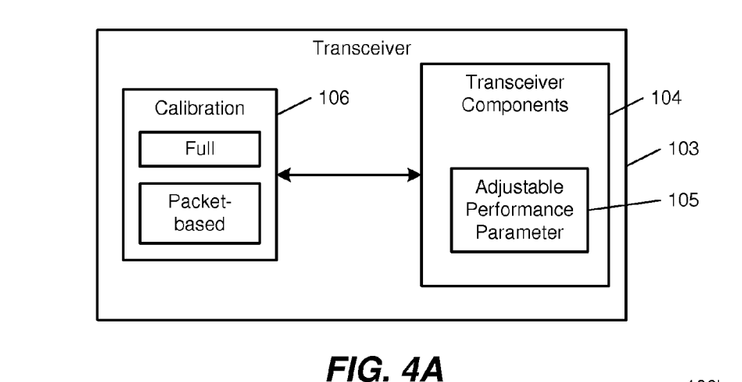
FIG. 4A is a functional block diagram of a transceiver including a packet-based calibration circuit.

Referring now to FIG. 4A, a transceiver 103 according to the present invention is shown and includes one or more transceiver components 104 having adjustable performance parameters 105. The transceiver 103 further includes a calibration circuit 106 that includes a packet-based calibration mode and an optional conventional full calibration mode.

Figure 4B:
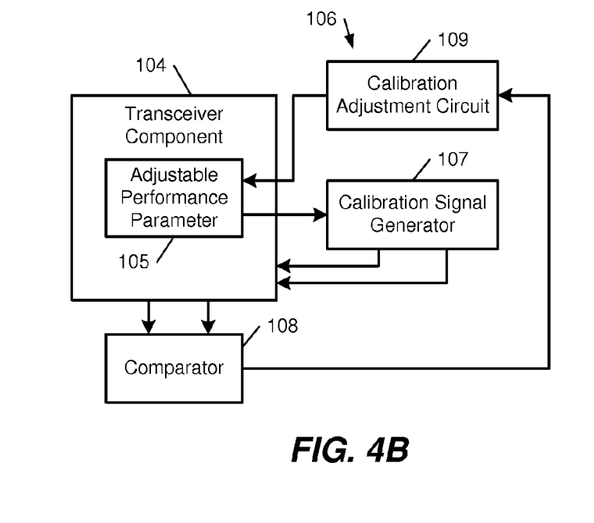
FIG. 4B illustrates a first exemplary implementation of the packet-based calibration circuit.

Referring now to FIG. 4B, in a first exemplary implementation the calibration circuit 106 includes a calibration signal generator 107, a comparator 108 and a calibration adjustment circuit 109. The calibration signal generator 107 outputs calibration signals to first and second inputs of the transceiver component 104. First and second outputs of the transceiver component 104 are input to first and second differential inputs of the comparator 108, which outputs adjustment signals to the calibration adjustment circuit 109. The calibration adjustment circuit 109 adjusts the performance parameter 105 of the transceiver component 104 to improve calibration.

Figure 4C:
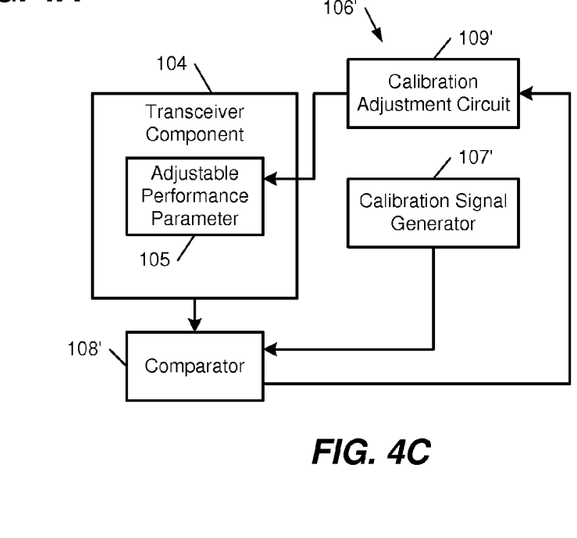
FIG. 4C illustrates a second exemplary implementation of the packet-based calibration circuit.

Referring now to FIG. 4C, in a second exemplary implementation the calibration circuit 106' includes a calibration signal generator 107', a comparator 108' and a calibration adjustment circuit 109'. The calibration signal generator 107' generates a reference signal that is output to the comparator 108'. An output of the transceiver component 104 is input to the comparator 108', which outputs adjustment signals to the calibration adjustment circuit 109'. The calibration adjustment circuit 109 adjusts the performance parameter 105 of the transceiver component 104 to improve calibration.

Figure 5:
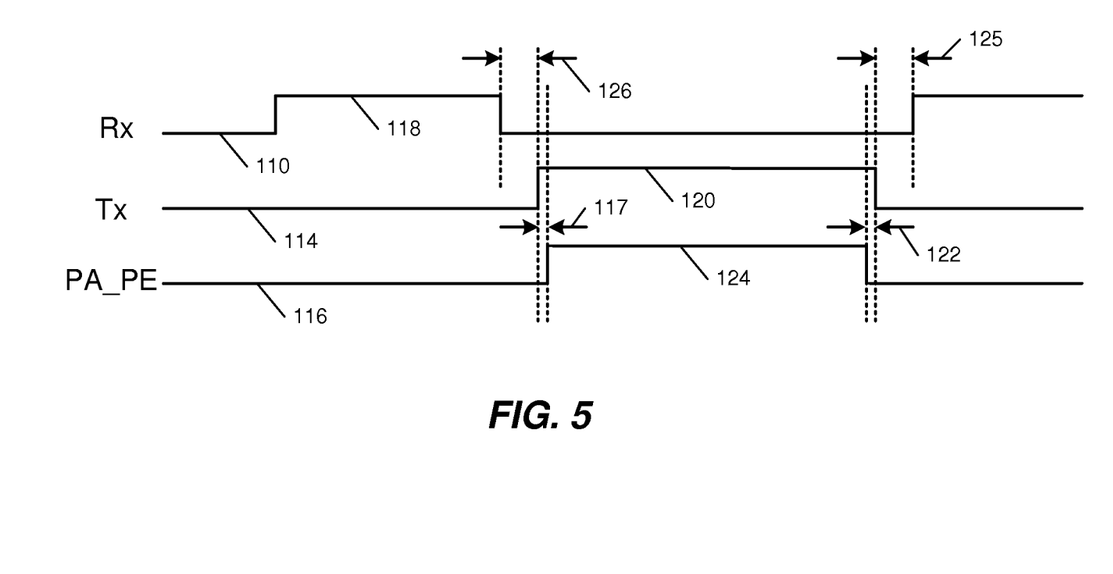
FIG. 5 illustrates the timing of power amplifier, receiver and transmitter enable signals.

Referring now to FIG. 5, receiver, transmitter and power amplifier enable signals 110, 114, and 116, respectively, are shown. An exemplary time period for performing incremental calibration is shown. Incremental calibration of transmitter and receiver performance parameters can be performed during idle time between data packets. For example, transmit RF mixer calibration according to the present invention can be performed during a first idle time period 117 between transmitter enable 120 and power amplifier enable 124. Transmit RF mixer calibration can also be performed during a second idle time period 122 between power amplifier enable 124 and a falling edge of transmitter enable 120. Skilled artisans will appreciate that the transmit RF mixer calibration can be performed during any other idle time between data packets. A typical value for the first and second idle time periods 117 and 122 is approximately 0.5 to 2 µs.

Receiver RF mixer incremental calibration can be performed at the beginning of the receiver enable signal 118. The data packet typically includes a preamble portion, a header portion, a data portion and a CRC portion. The preamble portion typically has a duration of many µs such as 56 us in 802.11b or 8 µs in 802.11g, and is used to train an equalizer in the receiver. For receiver related calibrations, a minimum overlap of receiver time is preferred to minimize or eliminate any adverse impact on system performance due to the calibration activities. Receive mixer calibration can also be performed during one of the first and second periods 117 and 122 to allow system performance optimization.

Incremental calibration of the transmitter for DC offset can be performed when the transceiver transitions out from a transmitter mode during a third idle time period 125. Incremental calibration of the receiver for DC offset can be performed when the transceiver transitions out from the receiver mode during a fourth idle time period 126. Skilled artisans will appreciate that full and/or incremental packet-based calibration of the performance parameters can be performed during any other idle time periods, non-idle time periods and/or during both idle and non-idle time periods without departing from the invention.

Figure 6:
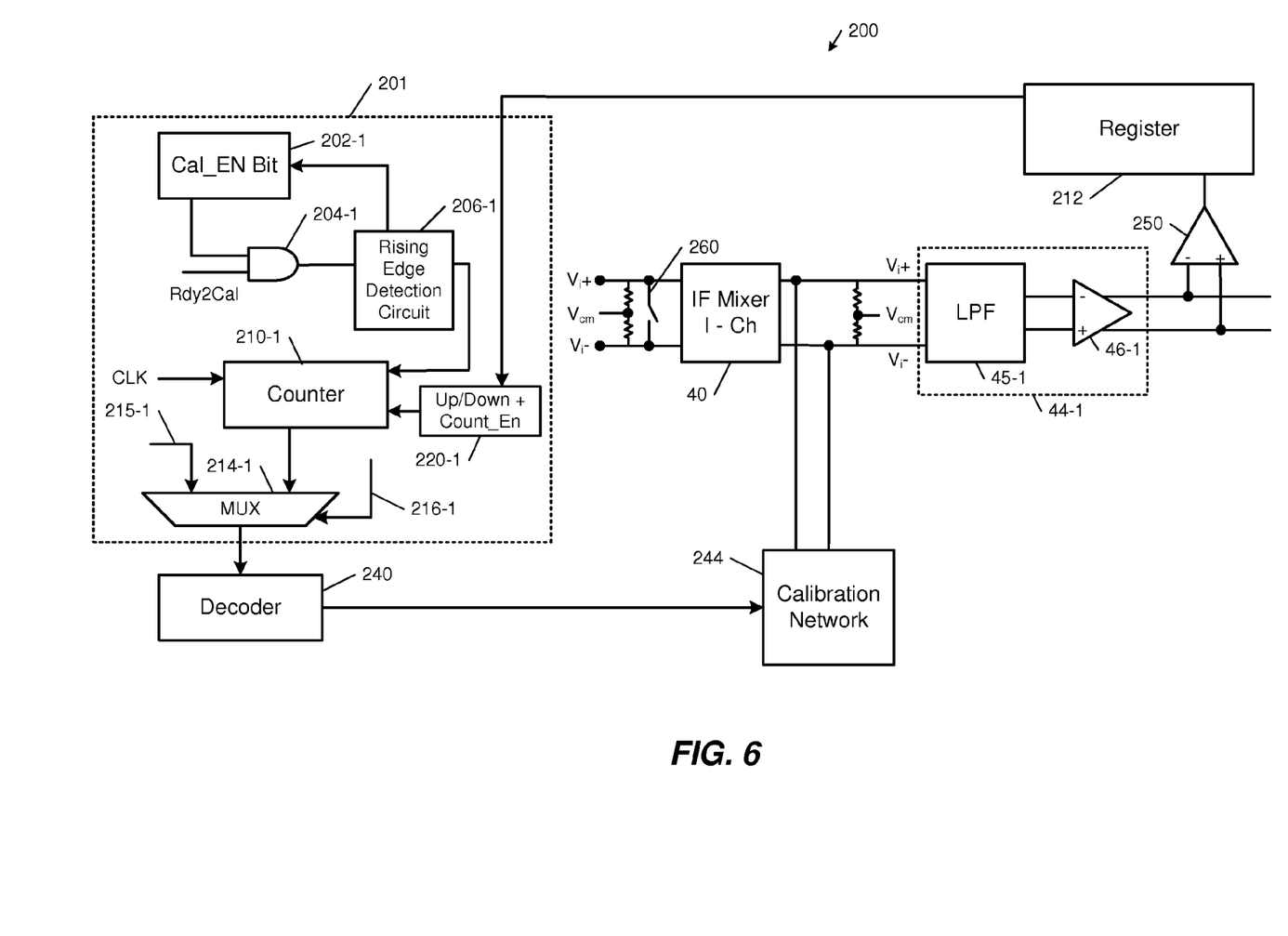
FIG. 6 illustrates a receiver voltage (or DC) offset calibration circuit.

Referring now to FIG. 6, a receiver Vos (DC Offset) calibration circuit 200 is shown and includes a calibration control block 201. The calibration control block 201 includes a calibration enable bit generator 202-1 that outputs a calibration enable signal to an input of AND gate 204-1. The calibration ready signal is also input to the AND gate 204-1. A rising edge detection circuit 206-1 receives an output of the AND gate 204-1 and generates an output signal that is input to allow it to either count up or down depending on the output of calibration counter of 220-1. The counter 210-1 receives a clock signal. The up/down control from 220-1 is derived from the logic state of comparator 250 output which is stored in memory device 212.

The receiver Vos calibration circuit 200 includes two calibration circuits for 1 and Q channels. An output of the calibration control block 201 is input to a decoder 240. An output of the decoder 240 is input to a calibration network 244, which provides a controlled injection current. An I channel of the IF mixer 40 is connected to the baseband circuit 44-1. The baseband circuit 44-1 may include the LPF 45-1 and the amplifier 46-1. A comparator 250 is connected to outputs of the baseband circuit 44-1. An output of the comparator 250 is connected to the register 212, which is connected to the up/down and count enable circuit 220-1.

The calibration protocol of Vos for the receiver I-Q channel baseband circuits (including the offset introduced by the receiver IF mixer) can be divided into two phases. Phase 1 is a full calibration and is performed when the transceiver 10 is powered up, exits from power down, has a hardware and/or software reset, and optimally when the frequency synthesizer changes channels. As can be appreciated, full calibration may be performed in other circumstances as well.

The counter 210-1 is reset to a preset initial value. The output logic state of comparator 250 determines if counter 210-1 to count up or down. The counter 210-1 stops counting when the state changes a predetermined number of consecutive times from up to down. For example, up, up, up, up, down, up, down, up.

Phase 2 is an incremental calibration that is performed during idle time when the transceiver 10 transitions from the receiver mode to the transmitter mode. A MAC layer of the transceiver 10 can control power enable signals that command the transceiver 10 to exit from receiver mode to the transmitter mode or to standby modes. To reduce power consumption, the receiver can go into a partial power down mode (or sleep mode) as the transceiver exits from the receiver mode. Instead of allowing all receiver circuit blocks to go into sleep mode, some receiver circuits (such as the baseband circuit 44-1 which may contain the LPF 45-1 and amplifier 46-1 and the IF mixer 40) remain active until the incremental calibration is completed.

Instead of resetting the up/down counter 210-1 to the preset value (as in the full-calibration case), the calibration starts at an existing counter value. The calibration stops when the up/down and count enable circuit 220-1 transitions or after the predetermined number of clock cycles. During calibration, the differential inputs of the receiver IF mixer 40 can be shorted together using one or more switches 260. As a result, the DC offset introduced by the IF mixer 40 is also be calibrated out.

Figure 7:
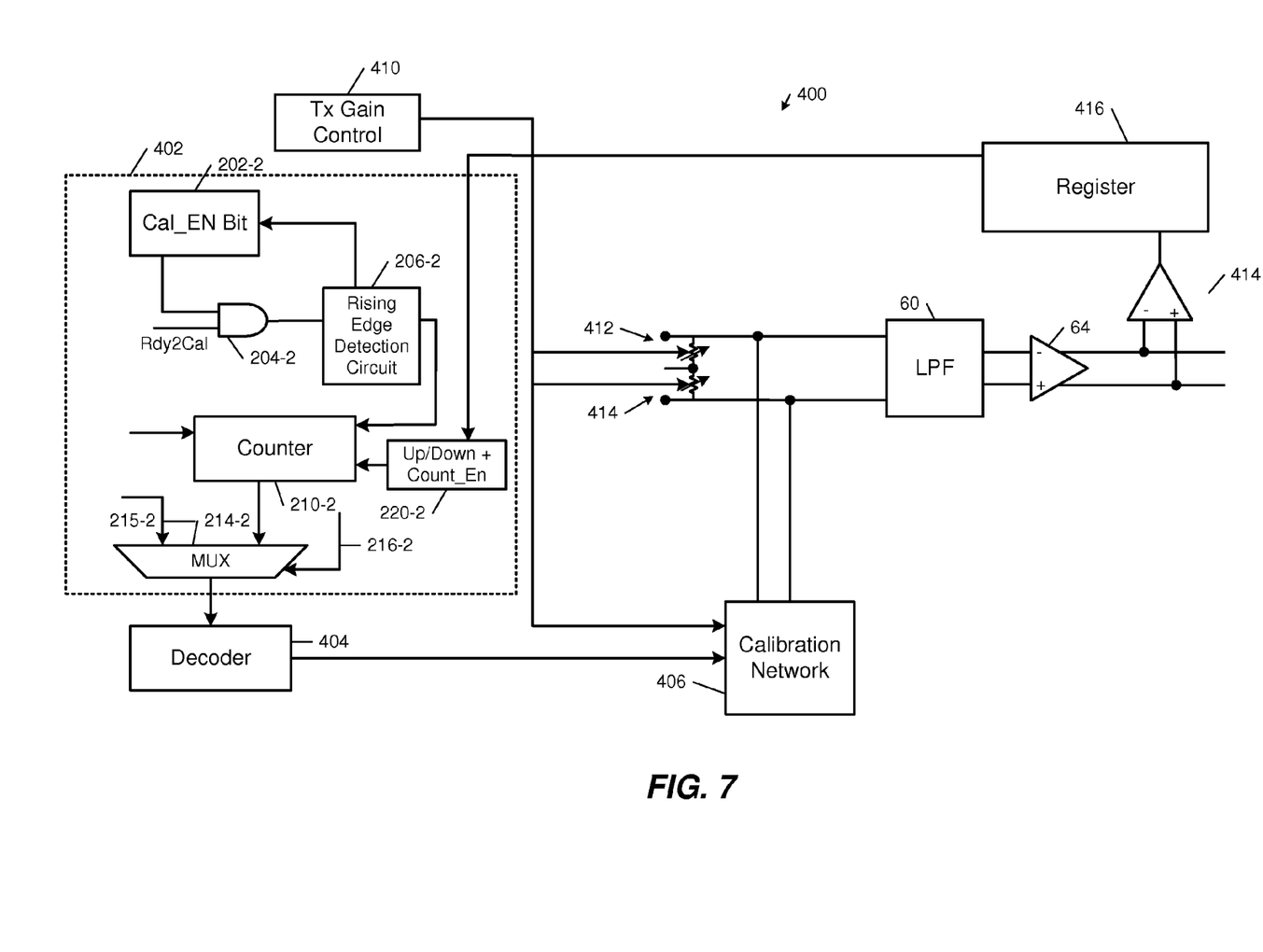
FIG. 7 illustrates a transmitter voltage (or DC) offset calibration circuit.

Referring now to FIG. 7, a transmitter $V_{os}$ (DC Offset) calibration circuit 400 is illustrated and includes a calibration control block 402 that is similar to the calibration control block 201. The transmitter $V_{os}$ (DC Offset) calibration circuit 400 is similar to the receiver Vos calibration circuit 200. The transmitter Vos (DC Offset) calibration circuit 400 includes two separate calibration circuits for I and Q channels.

An output of the calibration control block 402 is input to a decoder 404. An output of the decoder 404 is input to a calibration network 406, which injects current into the LPF 60. An output of the LPF 60 is input to the IF mixer 64. Outputs of the IF mixer 64 are input to a comparator 414. An output of the comparator 414 is input to a register 416 or other storage device. An output of the register 416 is input to the up/down and counter enable circuit 220-2.

The calibration protocol of the transmitter Vos I-Q channel calibration circuits can be divided into two phases. Phase 1 is a full calibration. The counter 210-2 is reset to a preset value. The output logic state of comparator 414 determines if counter 210-2 to count up or down. Stop criteria is similar to that of the receiver Vos calibration circuit 200.

Phase 2 is an incremental calibration that is performed when the transceiver transitions out from the transmitter mode. Instead of allowing the transmitter circuit blocks to go into sleep mode, some transmitter circuits such as the LPF 60 and the IF mixer 64 remain active until the packet-based calibration is completed.

When incremental packet-based calibration is performed after full calibration, instead of resetting the up/down counter to the preset value (as in the full-calibration case), the calibration starts at the current counter value. The calibration stops when an up/down transition occurs or after the predetermined number of clock cycles.

The comparator 414 can be a low offset, high gain comparator that is used to sense the DC offset output voltage at the final stage of the baseband circuit of the transmitter before the transmitter IF mixer 64. The differential transmitter inputs for both the I and Q channels are optionally isolated from the input pads by switching off a pair of switches (not shown) connected in series to isolate the circuit from variations in off-chip conditions during calibration.

Figure 8:
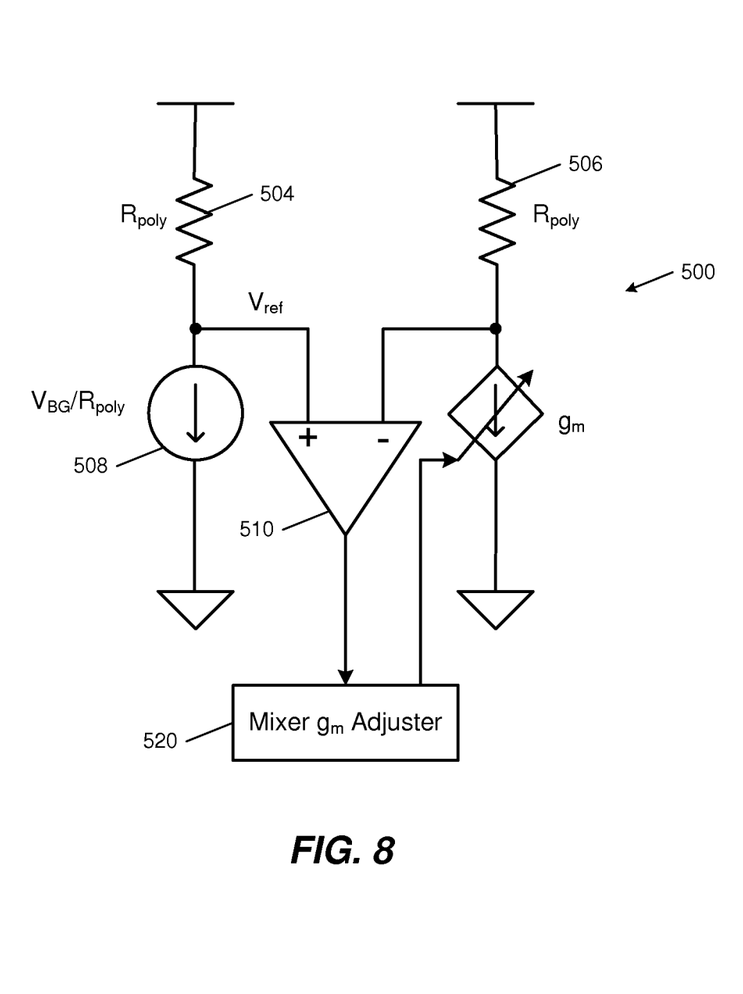
FIG. 8 illustrates a simplified RF mixer gain calibration circuit.

Referring now to FIG. 8, a simplified RF mixer gain circuit 500 is shown. The input gain devices of the transmitter and receiver RF mixers are biased by a relatively constant overdrive voltage (Vgs-Vt). As a result, the input linear range is controlled across process and temperature. The transconductance gain gm of the mixers is a function of 2ID/(Vgs-Vt). Since (Vgs-Vt) is approximately constant by design, gm is proportional to the bias current ID. Since the bias current Io and resistance Rpoly are known, gm can be determined and adjusted.

For a fixed (Vgs-VT) overdrive, the current ID changes with process variations (in other words, fast/slow corners, etc.). For a given process corner, the current ID also changes with temperature. Since the current $I_D$ is a function of both process corners as well as temperature, calibration can be performed frequently, such as for every packet. Alternatively, additional circuits may be used to allow calibration frequency to be programmed. Additional details can be found in "Mixer Constant Linear Range Biasing Apparatus And Method", U.S. patent application Ser. No. 10/388,920 (now U.S. Pat. No. 7,177,620), filed Mar. 14, 2003, and "Mixer Gain Calibration Method And Apparatus", U.S. patent application Ser. No. 10/292,087 (now U.S. Pat. No. 6,983,135), filed Nov. 11, 2003, which are hereby incorporated by reference.

The simplified RF mixer gain calibration circuit 500 includes a matched resistor 504 and a current source 508 (such as $V_{BG}/R_{poly}$) to generate a reference voltage $V_{ref}$ that is input to a comparator 510. $V_{ref}$ is compared to an actual voltage $V_{act}$ of the mixer by the comparator 510. $V_{act}$ is related to the current $I_D$ ($V_{act}=I_DR_{poly}$). A voltage difference signal is output by the comparator and is used by a $g_m$ adjustment circuit 520 to adjust $g_m$.

Figure 9:
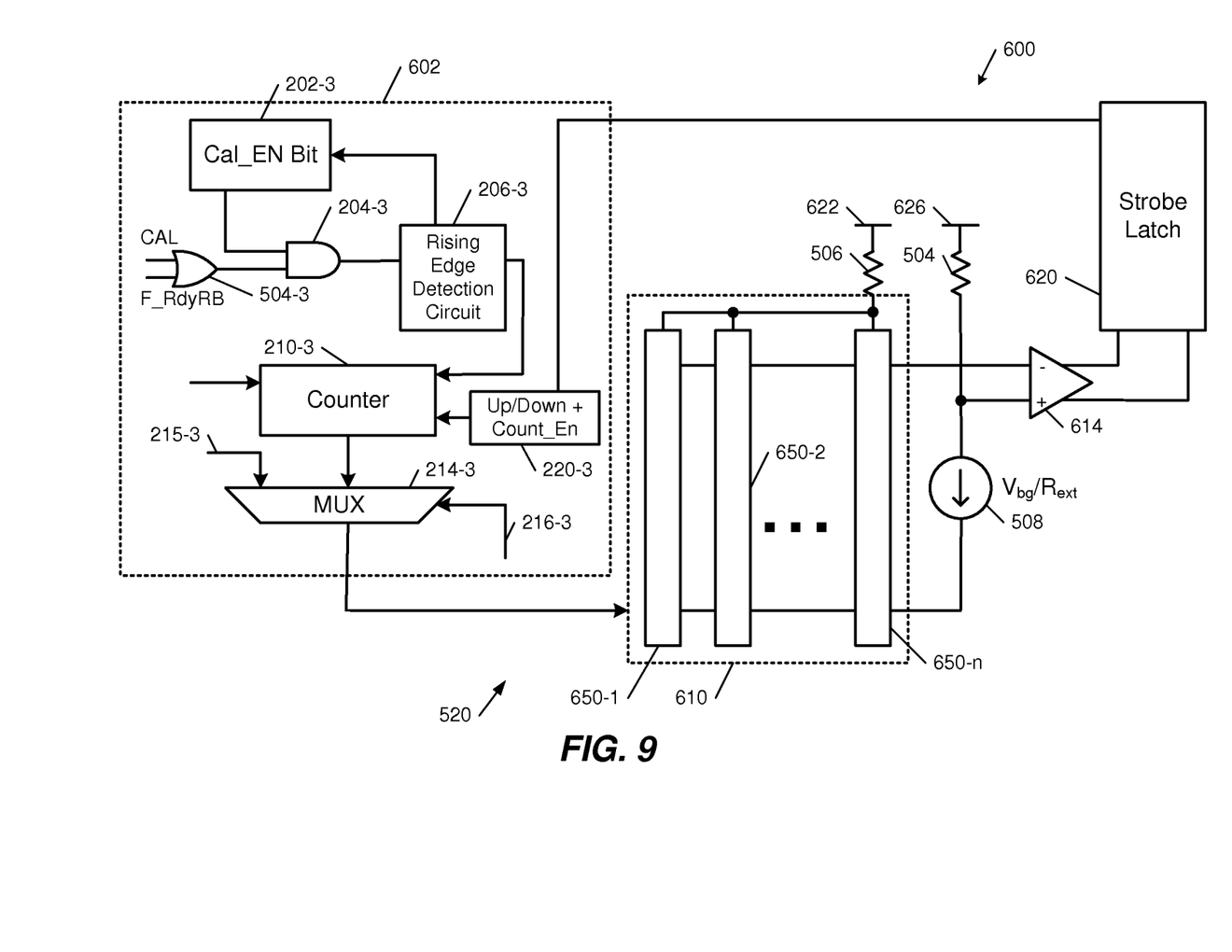
FIGS. 9 and 10 illustrate a transmitter RF mixer gain calibration circuit.
Figure 10:
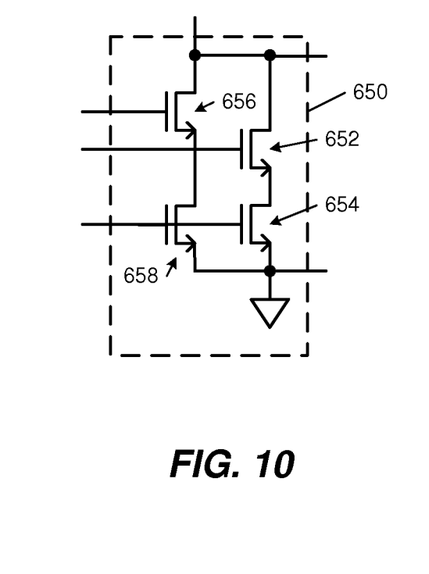

Referring now to FIGS. 9 and 10, a transmitter and receiver RF mixer gain calibration circuit 600 is shown and includes a calibration control block 602, which is similar to control blocks 201 and 402. An output of the multiplexer 214-3 is input to binary weighted $g_m$ stages 610. An output of the binary weighted $g_m$ stages 610 are input to a comparator 614 having outputs connected to a register 620 or other storage devices.

A voltage source 622 and a resistor 504 are connected to the final stage of the binary weighted $g_m$ stage 610. A voltage source 626 and a resistor 504 are connected to a noninverting input of the comparator 614. A current source 630 is connected to the binary weighted $g_m$ stages 610 as shown. The register 620 is connected to the up/down and count enable circuit 304-5. In FIG. 10, each stage 650-1, 650-2, ..., and 650-x of the binary weighted $g_m$ stages 610 includes a plurality of switches 652, 654, 656, and 658 that are connected as shown.

Similar to the $V_{os}$ calibrations, the transmitter and receiver mixer gain calibrations have two phases. For the transmitter, Phase 1 is a full calibration and is similar to the Phase 1 of $V_{os}$ calibrations. The stop criteria applied is same as that of $V_{os}$ calibrations.

Phase 2 is an incremental calibration that is performed when the transceiver 10 enters transmitter mode. Due to the turn-around time requirements, the calibration is fast—typically less than 1 μs. For example, to achieve this calibration speed, the clock frequency can be increased. To minimize the impact of the calibration time on turn-around time, transmitter incremental calibration can also be initiated by detecting power amplified power enable (PA_PE) going to "0".

For the receiver, Phase 1 is similar to that of the transmitter. In phase 2, receiver RF mixer gain is calibrated when the transceiver enters receiver mode. The receiver mixer gain calibration circuit is similar to that of the transmitter gain calibration circuit. Alternately, 4-bit thermometer coded $g_m$ cells are used instead of binary weighted cells. The receiver incremental calibration can also be initiated by detecting PA_PE going to "0".

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system comprising:
    a component of a transceiver, wherein the component is configured to (i) receive an input signal comprising packets, and (ii) based on the input signal, generate output signals to transmit the packets from the transceiver;
    a first comparator configured to compare the output signals to generate a first comparison signal;

a counter configured to (i) receive a clock signal, and (ii) count cycles of the clock signal to provide a count value;

a control device configured to, based on the first comparison signal, transition the counter between (i) incrementing the count value and (ii) decrementing the count value; and a calibration circuit configured to
operate in a first calibration mode and a second calibration mode,
operate in the first calibration mode based on whether the transceiver (i) transitions from being powered down to being power up, or (ii) changes channels,
operate in the second calibration mode based on the transceiver transitioning between (i) operating in a receiver mode and (ii) operating in a transmitter mode,
during the first calibration mode, calibrate the component until the counter transitions a predetermined number of times between (i) incrementing the count value and (ii) decrementing the count value, and
during the second calibration mode, calibrate the component until the counter (i) transitions between incrementing the count value and decrementing the count value, or (ii) counts a predetermined number of cycles of the clock signal.

2. The system of claim 1, wherein the calibration circuit is configured to, while operating in the first calibration mode, calibrate the component until the counter successively transitions the predetermined number of times between (i) incrementing the count value and (ii) decrementing the count value.

3. The system of claim 1, wherein:
the counter is reset at a beginning of the first calibration mode; and
the counter is not reset at a beginning of the second calibration mode.

4. The system of claim 1, further comprising a switch configured to short differential inputs of the transceiver during calibration of the component.

5. The system of claim 1, further comprising:
a decoder configured to decode an output of the counter; and
a calibration network configured to (i) receive an output of the decoder, and (ii) provide a differential current at inputs of the component during calibration of the component.

6. The system of claim 5, further comprising:
a plurality of variable resistors connected in series between differential inputs of the transceiver; and
a gain device configured to generate a control signal to adjust resistances of the variable resistors,
wherein the calibration network is configured to receive the control signal.

7. The system of claim 1, wherein the component comprises:
a mixer configured to receive the input signal; and
a baseband circuit comprising
a low pass filter connected to (i) the output of the mixer and (ii) an output of the calibration circuit, wherein the low pass filter is configured to generate a filtered signal, and
an amplifier configured to amplify the filtered signal to generate the output signals.

8. The system of claim 1, wherein the calibration circuit further comprises:
an enable bit generator configured to generate an enable signal based on a first output signal;

an AND gate configured to AND the enable signal with a ready signal to generate a second output signal; and
a detection circuit configured to (i) detect a rising edge of the second output signal generated by the AND gate and (ii) generate the first output signal and a third output signal,
wherein the counter is configured to provide the count value based on the third output signal.

9. The system of claim 1, wherein the calibration circuit comprises:
a resistance having an output and connected to a first voltage source;
a variable current device connected to the output of the resistance;
a second comparator connected to the output of the resistance, wherein the second comparator is configured to generate a second comparison signal based on a reference signal and a voltage at the output of the resistance; and
an adjuster configured to adjust the variable current device based on the second comparison signal,
wherein
the calibration circuit is configured to output a current signal to adjust a current in the component, and
the component is configured to (i) based on the current signal, adjust a performance parameter of the transceiver at times synchronized with the packets, and (ii) generate the output signals based on the current signal and the reference signal.

10. The system of claim 9, wherein:
the component comprises a mixer; and
the adjuster is configured to adjust a gain of the mixer.

11. The system of claim 9, wherein:
the component comprises a gain stage with a plurality of switches; and
the adjuster is configured to adjust states of the plurality of switches based on the second comparison signal.

12. The system of claim 11, wherein the gain stage comprises:
a first stage comprising an output and a first plurality of switches; and
a second stage connected to the output of the first stage and comprising a second plurality of switches, wherein the second plurality of switches are connected in parallel with the first plurality of switches.

13. The system of claim 11, wherein the gain stage comprises:
a first switch connected to the output of the resistance;
a second switch connected (i) in series with the first switch, and (ii) to an output of the gain stage;
a third switch connected to the output of the resistance; and
a fourth switch connected (i) in series with the third switch and (ii) to the output of the gain stage.

14. A method comprising:
receiving an input signal comprising packets at a component of a transceiver;
based on the input signal, generating output signals, via the component, to transmit the packets from the transceiver;
comparing the output signals to generate a first comparison signal;
receiving a clock signal at a counter;
counting cycles of the clock signal to provide a count value;
based on the first comparison signal, transitioning the counter between (i) incrementing the count value and (ii) decrementing the count value;
operating a calibration circuit in a first calibration mode or a second calibration mode;

operating in the first calibration mode based on whether the transceiver (i) transitions from being powered down to being power up, or (ii) changes channels;

operating in the second calibration mode based on the transceiver transitioning between (i) operating in a receiver mode and (ii) operating in a transmitter mode;

during the first calibration mode, calibrate, via the calibration circuit, the component until the counter transitions a predetermined number of times between (i) incrementing the count value and (ii) decrementing the count value; and during the second calibration mode, calibrate, via the calibration circuit, the component until the counter (i) transitions between incrementing the count value and decrementing the count value, or (ii) counts a predetermined number of cycles of the clock signal.

15. The method of claim 14, comprising, while operating in the first calibration mode, calibrating the component until the counter successively transitions the predetermined number of times between (i) incrementing the count value and (ii) decrementing the count value.

16. The method of claim 14, further comprising:
resetting the counter at a beginning of the first calibration mode; and
incrementing or decrementing the counter value without resetting the counter at a beginning of the second calibration mode.

17. The method of claim 14, further comprising:
generating an enable signal based on a first output signal;
via an AND gate, AND the enable signal with a ready signal to generate a second output signal;
detecting a rising edge of the second output signal generated by the AND gate; and
generating the first output signal and a third output signal, wherein the count value is provided based on the third output signal.

18. The method of claim 14, wherein the calibration circuit comprises:
generate an output via a resistance based on a voltage of a voltage source;
providing a current via a variable current device based on the output of the resistance;
generating a second comparison signal based on a reference signal and a voltage at the output of the resistance;
adjusting the variable current device based on the second comparison signal;
outputting a current signal from the calibration circuit to adjust a current in the component;
based on the current signal, adjust a performance parameter of the transceiver at times synchronized with the packets; and
generating the output signals based on the current signal and the reference signal.

19. A system comprising:
a component of a transceiver, wherein the component is configured to (i) receive an input signal comprising packets, and (ii) based on the input signal, generate output signals to transmit the packets from the transceiver;
a first comparator configured to compare the output signals to generate a first comparison signal;
a counter configured to (i) receive a clock signal, and (ii) count cycles of the clock signal to provide a count value;
a control device configured to, based on the first comparison signal, transition the counter between (i) incrementing the count value and (ii) decrementing the count value;
a calibration circuit configured to
operate in a first calibration mode and a second calibration mode,
during the first calibration mode, calibrate the component until the counter transitions a predetermined number of times between (i) incrementing the count value and (ii) decrementing the count value, and
during the second calibration mode, calibrate the component until the counter (i) transitions between incrementing the count value and decrementing the count value, or (ii) counts a predetermined number of cycles of the clock signal;
a decoder configured to decode an output of the counter;
a plurality of variable resistors connected in series between differential inputs of the transceiver;
a gain device configured to generate a control signal to adjust resistances of the variable resistors; and
a calibration network configured to (i) receive an output of the decoder and the control signal, and (ii) provide a differential current at inputs of the component during calibration of the component.

* * * * *